July 17, 1956
T. L. SCHMIDT
2,755,045
WING TANK AND NAPALM BOMB
Filed Dec. 22, 1951
3 Sheets-Sheet 1
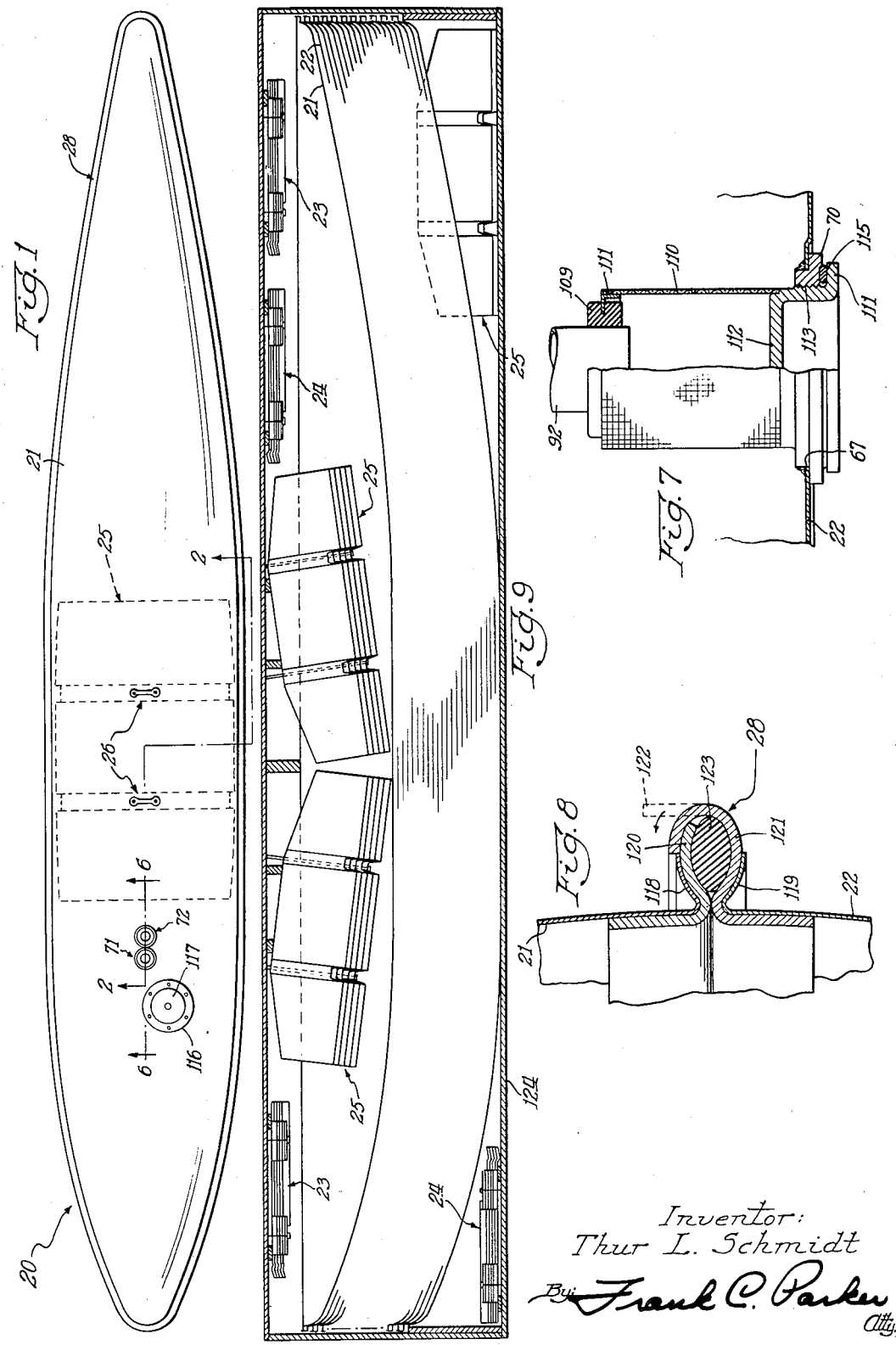
Inventor:
Thur L. Schmidt
By: Frank C. Parker
Atty.

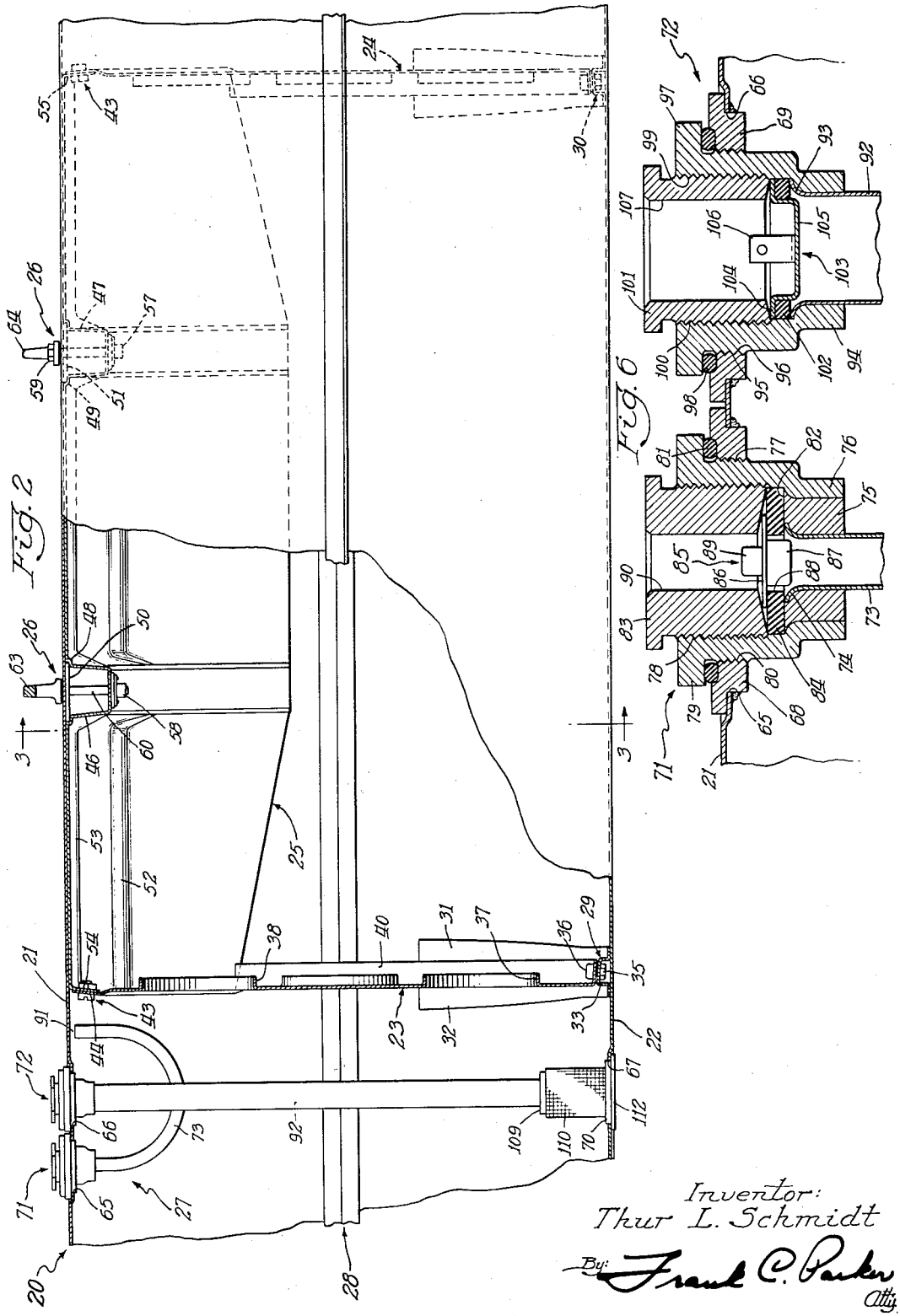

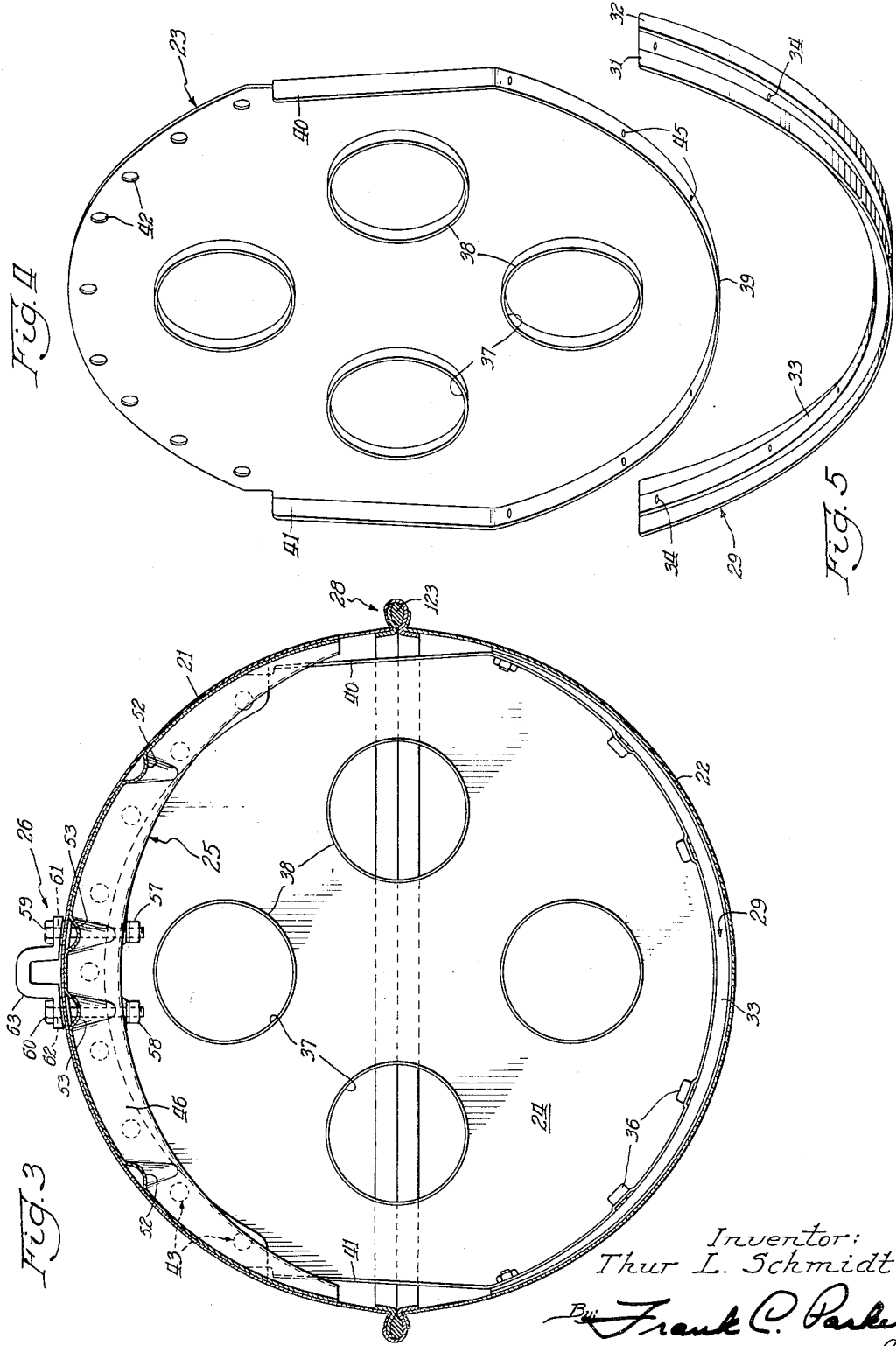

United States Patent Office 2,755,045
Patented July 17, 1956

2,755,045

WING TANK AND NAPALM BOMB

Thur L. Schmidt, Chicago, Ill., assignor to Borg-Warner Corporation, Chicago, Ill., a corporation of Illinois Application December 22, 1951, Serial No. 262,933

11 Claims. (Cl. 244—135)

This invention relates in general to improvements in aircraft wing tanks of the jettisonable type, which are adapted to be used either as fuel tanks or napalm bombs and has particular reference to the provision of an external wing tank adapted to be shipped in unassembled nested relation and later assembled at the point of use.

It has been long recognized that one of the important factors in the construction of a proper wing tank of the jettisonable type is that of providing a tank which is capable of being transported to the place of use in unassembled relationship and preferably capable of being shipped with a plurality of similar parts in the same container so as to provide a number of wing tanks and reduce shipping and storage space thereof. In order to accomplish the aforementioned factor various attempts have been made to provide a wing tank of this general class and efforts have been made to overcome deficiencies found in the prior art structures, but to the best of the applicant's knowledge prior art structures have had only limited success and have been accorded only limited recognition. It is believed that this fact results from an apparent deficiency in the prior art structures, their nonadaptability for unassembled shipping and their expensive constructions so as to greatly increase the cost of manufacture.

The present improvements in wing tanks are directed to simplify their construction and to provide a wing tank of the jettisonable type which may be readily and conveniently assembled at the point of use. Moreover, the present device seeks to employ conventional parts wherever necessary and possible, thereby to effect a further substantial reduction in the cost over the prevailing types of wing tanks presently utilized.

According to one aspect of the present invention the desired result may be obtained by utilizing a wing tank formed to define a streamlined contour and to provide complementary sections which when nested together one within the other are capable of being shipped in a comparatively small space.

Accordingly, an object and accomplishment of my invention is to provide a wing tank defined by a pair of sections which are adapted to nest within one another and are also capable of being shipped in nested relation with other parts of similar construction in a relatively small shipping space.

Another object and accomplishment of my invention is to provide an improved wing tank as contemplated herein and which may be manufactured in sections thereby to increase the versatility of the unassembled parts in that various sections can be used interchangeably with various parts of other tanks.

Another object and accomplishment of my invention is to provide a method of assembling a wing tank of this general class at the place of use in a relatively simple and convenient manner.

Another goal of this invention is to provide a new and improved method and means of sealing two sections of a wing tank together by merely providing each section with a bendable seaming means which will encompass a sealing gasket and suitably bending said seaming means in overlapping relationship.

Another object and accomplishment of my invention is to provide a plurality of various manufactured sections with a capability of being shipped in nested relationship with one another thereby substantially reducing the shipping space of a plurality of unassembled wing tanks and which can be sealed together in leak-proof relationship by the simple expedient of providing seaming strips which cooperate with each other to form a seal.

This invention seeks as a further object and accomplishment to provide a wing tank and an arrangement thereof as contemplated herein and particularly characterized by an arrangement of parts to more advantageously and satisfactorily perform the functions required of them and adapted to provide a compact unit both in shipping and in use, which will successfully combine the factors or structural simplicity and durability and yet be economical to manufacture.

A further object and accomplishment of this invention is to provide a new and improved form of wing tank or napalm bomb of the jettisonable type which is adapted to be economically pre-fabricated and which is so designed as to permit assembly thereof at a point distant from its place of manufacture and thus results in a substantial reduction in the cost of logistics.

A further object of this invention is to provide an external wing tank or napalm bomb which is susceptible to present day large scale mass production methods and which is adapted to be assembled at a point remote from the production by persons who have a minimum amount of training.

Additional objects, features and advantages of the invention disclosed herein will be apparent to persons skilled in the art after the construction and operation are understood from the within description.

It is preferred to accomplish the various objects of my invention and to practice the same in substantially the manner as hereinafter more fully described, and, as more particularly pointed out in the appended claims.

With the above and other incidental objects in view, the invention has other marked improvements and superiorities which radically distinguish it from presently known structures, these improvements in the invention residing in the novel construction and cooperative function of the parts thereof, the combination of the parts and the arrangement thereof as illustrated in the drawings and which will be more fully described hereinafter and particularly pointed out in the appended claims.

In the accompanying drawings on which there is shown a preferred embodiment of the invention:

Fig. 1 is a top plan view of the wing tank assembly embodying the features of the present invention;

Fig. 2 is a side elevational view of the wing tank assembly depicted in Fig. 1 and having portions thereof partially cut away and taken substantially on the plane of line 2—2 in Fig. 1 in the direction of the arrows in order to clearly illustrate the construction thereof in assembled relationship;

Fig. 3 is an end sectional view of the wing tank assembly shown in Figs. 1 and 2 and taken substantially on the plane of line 3—3 in Fig. 2 in the direction of the arrows in order to illustrate the internal reinforcement and relationship of the sections in assembled relationship;

Fig. 4 is a perspective view of an unassembled baffle plate showing the various component parts thereof;

Fig. 5 is a perspective view of a reinforcing rib which forms part of the internal reinforcement and depicted in unassembled relationship;

Fig. 6 is a sectional view taken substantially in the plane of line 6—6 in Fig. 1 and showing an enlarged detailed construction of part of the fuel supply system;

Fig. 7 is an enlarged detailed sectional view of the remainder of the fuel supply system;

Fig. 8 is an enlarged elevational view showing the detailed construction of the new method and means of sealing the sections of the wing tank together in leak-proof relationship; and Fig. 9 is a side elevational view of the new and improved method and means of preparing and enclosing several wing tank parts embodied in the present invention, for storage and shipping.

The drawings are to be understood to more or less be of a schematic character for the purpose of illustrating and disclosing the typical or preferred form of the improvements contemplated herein, and in the drawings like reference characters identify the same parts in the several figures.

Reference is made to the drawings, particularly to Figs. 1, 2 and 3 wherein there is illustrated a jettisonable wing tank and napalm bomb with which the present invention is particularly concerned and designated in its entirety by numeral 20 and comprising, in general, a pair of upper and lower sections or shells 21 and 22 which are capable of being nested within one another for shipping and storage purposes and which when secured together in complementary relationship define a wing tank of streamlined contour as shown.

The tank, when in assembled unitary condition, is capable of performing the operation desired of it, and comprises, in general, in addition to the two main upper and lower sections 21 and 22, the main component parts which are depicted in their entirety by their associated reference numerals, namely a pair of baffle plates 23 and 24, a saddle 25, attaching means or shackles 26 for securing the tank to its associated wing, an air and fuel supply system 27 for filling and emptying the tank as desired, and the sealing means 28 for assembling and sealing the entire tank in unitary leak-proof relationship.

In order to suitably reinforce the lower section 22 a pair of hat-section reinforcing ribs 29 and 30, one of which is shown in detail in Fig. 5, are formed to correspond to the inner surface contour of the lower section by providing each with a pair of base flanges 31 and 32, an elongated raised portion 33 located centrally thereof, and by complementarily varying the height of the raised portion and the width of the flanges whereby the height of the raised portion is the greatest at the central portion of the rib and the flanges are the widest at the end portions of the rib, as clearly depicted in Figs. 2 and 5.

It is to be understood also that the raised portion of the rib is inclined slightly, as shown, to facilitate its cooperation with its associated parts. The raised portion 33 is provided with a plurality of evenly spaced apertures 34 into each of which there is inserted a nut 35 of the type such as a clinch nut, which will remain permanently therein and which is adapted to receive its associated bolt 36 when the baffle plates 23 and 24 are secured to the rib. After the ribs 29 and 30 are formed and the clinch nuts are inserted therein, the ribs are then suitably welded or otherwise affixed according to approved practice to the lower section 21.

The baffle plates 23 and 24, one of which is shown in detail in Fig. 4, are formed to cooperate with the reinforcing ribs 29 and 30. Each is provided with a plurality of substantially centrally located apertures 37 and flanges 38 thereon. There is formed throughout a large portion of the periphery of the baffle plates a flange with an arcuate lower portion 39 corresponding to the curvature of its associated reinforcing rib 29 or 30 and inclined to correspond to the inclined raised portion of said rib and with a pair of straight flanged portions 40 and 41 to provide a cut-away space for the sealing means 28 when in assembled relationship. The remaining periphery of the baffle plates are provided with a plurality of equally spaced apertures 42 each of which is adapted to receive the nut and bolt assembly 43 to suitably secure the saddle 25 to the baffle plate 23. It is noted that the remaining portion of the periphery of the baffle plates have been slightly inclined as at 44 (see Fig. 2) to facilitate its cooperation with the saddle 25. The arcuate peripheral flanged portion 39 of the baffle plates 23 and 24 are provided with a plurality of equally spaced apertures 45 which correspond to the apertures 34 in the raised portion of its associated reinforcing rib, and which are adapted to receive the bolts 36 so that the baffle plates can be secured thereto.

Adverting to Figs. 2 and 3 there is shown the saddle 25 which conforms to the contour of the inner surface of the upper section 21 and is provided with a pair of transverse indentations 46 and 47 and in the exemplary embodiment shown are substantially trapezoidal in cross section and are provided centrally thereof with additional depressions outlining rectangles 48 and 49 which are adapted to receive a pair of rectangular apertured reinforcing plates 50 and 51 when in assembled relationship. For additional reinforcement, longitudinal recesses 52 and 53 are provided transverse to the aforementioned indentations 46 and 47. The end portions of the saddle are formed with flanges 54 and 55 and suitably apertured to complement the inclined upper portion 44 and apertures 42 of the baffle plates 23 and 24 and to be received by the nut and bolt assembly 43 in assembled relationship.

On the underside of the indentations 46 and 47 and centrally located with respect to the saddle, there is provided bolt receiving means or coupling means 57 and 58 adapted to receive bolt means 59 and 60 when in threaded assembled relationship. Thus, the bolt means 59 and 60 are inserted, when assembled, through apertures 61 and 62 in a pair of U-shaped hooks 63 and 64, through a pair of apertures in the upper section or shell 21 and the apertures in the rectangular plate means and are threadably coupled in the bolt receiving means 57 and 58, thus completing a new and improved means of rigidly securing the attaching means or shackles 26 to the entire wing tank assembly.

Referring now to Figs. 6 and 7 there is shown an enlarged detailed assembly of the fuel supply system 27 wherein the upper and lower sections or shells 21 and 22 are provided with apertures 65, 66 and 67, respectively, and into which are weldably inserted reinforcing mounting means 68, 69 and 70, respectively. These mountings are adapted to receive the associated parts of the fuel supply system 27 and which comprises in general the air supply means 71 and fuel supply means 72. The air supply means 71 for the new and improved wing tank assembly comprises a tube 73 which at one end has a flanged portion 74 adapted to be inserted within an inner sleeve 75, the latter being secured within an outer sleeve 76. The outer sleeve 76 is provided with external and internal threads 77 and 78, respectively, and at one end with a flanged portion 79 adapted to cooperate, when threaded within the internal threads 80 of the reinforcing mounting 68, to hold a sealing gasket 81 therebetween. The top face 82 of the inner sleeve 75 cooperates with a plug 83 provided with external threads and threadably inserted into the outer sleeve 76 to hold a sealing gasket 84 and a shipping plug, generally designated in its entirety as 85. This shipping plug 85 comprises a flat top portion 86, a centrally and downwardly located insert portion 87 adapted to be inserted within the aperture 88 of the sealing gasket 84 and an apertured withdrawal means 89 to facilitate removal of the entire plug, if desired. It is noted that the externally threaded plug 83 which holds the shipping plug 85 on the gasket 84 is also provided with a centrally axially located bore 90 to allow air to enter the tube when the shipping plug is removed. Now with respect to the opposite end of the bent tube 73, as shown in Fig. 2, it can be seen that said tube is located in close proximity to the underside of the top section 21 so as to provide an air gap 91 therebetween which will allow air to enter the tank but prevent loss of fuel therefrom.

The fuel supply means 72 of the entire fuel supply system 27 comprises a centrally located tube 92, one end of which has a flange 93 which is adapted to be inserted in a sleeve 94 which is threadably associated with the mounting 69 by means of external threads 95 cooperating with internal threads 96 of the mounting means 69. The sleeve 94 is further provided with a flange 97 so as to cooperate with the mounting 69 to hold a sealing gasket 98 therebetween. In addition, the sleeve 94 has internal threads 99 which cooperate with external threads 100 of a plug 101, the latter cooperating with the flanged portion 93 of the tube 92 to hold therebetween a gasket 102 and a shipping plug, designated in its entirety by numeral 103. This shipping plug 103 comprises a flanged portion 104 and a downwardly extended central portion 105 with an apertured withdrawing means 106 which provides a means to remove the plug 103 when desired. It is noted that the externally threaded plug 101 which holds the shipping plug 103 against the gasket 102 is also provided with a centrally axially located bore 107 into which conduits (not shown) can be inserted to withdraw fuel from the tank. The opposite end of the tube 92, as clearly shown in Fig. 7, is inserted within a resilient washer means 109 which cooperates with a cylindrical screen-like member 110 and a washer-like member 111 to provide a means of screening undesired properties from the fuel. The lower portion of the cylindrical screen-like member 110 cooperates with an externally threaded insert 112, threadably cooperating with the internal threads 113 of the mounting 70 through a flange 114 to hold a sealing gasket 115 therebetween to provide a complete fuel withdrawal means as shown. Thus, it can be seen that through the cooperative relationship of the various parts of the fuel system there is provided a means of allowing air to enter the tank and a convenient means of withdrawing fuel from the tank.

Referring now again to Fig. 1 it can be seen that the upper section 21 of the wing tank is further provided with additional mounting means 116 into which is threadably inserted a plug 117 so that fuel may be inserted into the tank independently of the air and fuel supply means 71 and 72, respectively.

With advertence to Fig. 8 wherein there is shown an exemplary enlarged detailed view of the method and means of sealing the two sections of the wing tank together, it is apparent that the upper and lower sections 21 and 22, respectively, are provided about their periphery with curved flanges 118 and 119, respectively, which are extended generally in an outwardly direction. The internal sides of each of these flanges, when pictured with the upper and lower sections in complementary relationship, are provided with additional curved seaming strips 120 and 121 which conform to the contour of the flanges 118 and 119 and extend outwardly therefrom. The seaming strip 120 of the upper section 21 is curved and extends only slightly beyond the flange 118 while the seaming strip 121 associated with the lower flange 119 is wider than the seaming strip 120 and extends a distance beyond in an arcuately upwardly direction terminating in an upwardly extending portion 122 shown in dashed lines. This construction of the lower seaming strip 121 with its arcuately upwardly extending end portion 122, as viewed in Fig. 8, defines a curved surface or means wherein the rubber-like resilient sealing gasket 123 can be nested while in unassembled relationship. Obviously the seaming strips 120 and 121 can be attached to the sections 21 and 22 in any conventional manner such as by riveting, welding, etc.

In assembly of the two sections 21 and 22, seaming strips 120 and 121 are brought together in contiguous complementary relationship so that the two curved portions thereof, being symmetrical, define a cavity with the sealing rubber-like resilient gasket 123 therebetween and the two sections 21 and 22 are sealed together by crimping or bending the upwardly extending portion 122 into overlapping relationship with the upper seaming strip 120 by any suitable means which will crimp or bend the upper portion 122 from the dashed position in the direction of the arrow to the position depicted in Fig. 8 and thus provide the sections with a leak-proof seal.

Having thus described the various elements of the wing tank in assembled and unassembled relationship, particular attention is invited to Fig. 9 which illustrates the convenient apparatus and method of packaging the various unassembled parts of the wing tank assembly for shipping and storage purposes so that there is effected a shipping unit which will provide enough parts for several complete tanks. Thus, it can be seen that a supply of upper and lower sections 21 and 22 are placed in nested relationship in a box or crate, designated in its entirety by numeral 124. In the spaces remaining, the remainder of the parts, namely, the baffle plates 23 and 24 and saddle 25 are conveniently nested within one another and affixed within the box by metal strappings or other suitable and well known means. All other necessary parts can be suitably arranged within the box in any desired manner. It is readily apparent also that the sealing gasket 123 can be conveniently left within the curved portion of the seaming strip 121 associated with the lower section while in the box. While there is shown enough sections and parts to assemble 11 complete tanks, it is to be understood that any number of sections and parts can be shipped together depending on the choice in size and dimension of the enclosure means or box 124.

Having thus described the general constructional features of the wing tank 20 as contemplated herein, the method of assembly will be explained hereinafter. Upon opening the box 124 which contains the various component parts of the external wing tank as contemplated herein the baffle plates 23 and 24 are fixed to the lower section 22 by inserting the bolts 36 into the clinch nuts 35 on the hat-shaped reinforcing ribs 29 and 30. Thus, having connected the saddle 25 to the other end of the baffle plates 23 and 24 by the nut and bolt assembly 43 and having placed the reinforcing plates 50 and 51 in the recesses 48 and 49, the upper section 21 is superimposed on the saddle and in complementary relationship with the lower section 22. Whereupon, the attaching means 26 is connected to the tank by threadably inserting the bolts 59 and 60 through the hook means 63 and 64 and into the threaded bolt receiving means 57 and 58. The two sections 21 and 22 are then secured together in leak-proof relationship by bending or crimping the extended portion 122 of the lower seaming strip 121 around the gasket 123 into overlapping relationship with the upper seaming strip 120, as clearly depicted in Fig. 8, by means of a suitable tool. The air and fuel supply system 27 is finally placed within the tank by threadedly inserting the same in the reinforcing mounting means provided therefor, thus completing an external wing tank of the jettisonable type available for immediate use.

The wing tank contemplated herein may be advantageously employed in mass production manufacturing methods as is readily apparent to persons skilled in the art. In this connection, the versatility of the wing tank as being capable of being shipped and stored in unassembled relationship and conveniently assembled as a unit at a point distant from the point of manufacture results in a considerable economy of manufacture and produces a substantial increase in efficiency and substantial reduction in the cost of logistics.

From the foregoing disclosure it can be seen that I have provided an improved wing tank which efficiently fulfills the objects thereof and hereinbefore set forth and provides numerous advantages.

While I have illustrated a preferred embodiment of my invention, many modifications may be made without departing from the spirit of the invention, and I do not wish to be limited to the precise details of construction set forth but wish to avail myself of all changes within the scope of the appended claims.

I claim:

1. In an external wing tank of the jettisonable type, means defining a baffle comprising substantially a flat plate having means defining a plurality of flanged apertures, a pair of oppositely disposed straight peripheral edges with flanges thereon defining a cut-off portion, a pair of oppositely disposed arcuate peripheral edges, one of the latter being flanged and substantially conforming to the inner contour of said tank, and means defining apertures adjacent one of said arcuate peripheral edges and on said arcuate flange for positioning said baffle in said tank.

2. In an external wing tank of the jettisonable type including internal reinforcing means, means cooperating with said reinforcing means and forming a part thereof for attaching the tank to a wing comprising means defining a saddle substantially conforming to the inner surface contour of the tank and attached to said inner surface, longitudinal and transverse indentations defining reinforcing ribs in said saddle, and coupling means associated with said transverse indentations.

3. The external wing tank as claimed in claim 2 wherein said coupling means include apertured plate means straddling the space defined by said transverse indentations, threaded bolt receiving means, U-shaped hook means, and bolts inserted into said hook means and said plate means and into cooperative relationship with said bolt receiving means whereby said U-shaped hook means are maintained on said tank to allow said tank to be attached to a wing.

4. An improved means for sealing the peripheries of two articles in leak-proof relationship comprising a concave channel-like outwardly extending curved flange on the periphery of one of said articles, a second concave channel-like outwardly extending curved flange on the periphery of the other of said articles, a curved seaming strip secured to said first flange and conforming to the contour thereof, a second curved seaming strip secured to said second flange and conforming to the contour thereof, said second seaming strip being wider than the first seaming strip and provided with an additional concave channel-like curved portion which overlaps the first seaming strip and defines a cavity between the two seaming strips, and a rubber-like resilient gasket disposed in said cavity and which cooperates with said strips to form a leak-proof seal.

5. An improved means for sealing the peripheries of two articles in leak-proof relationship comprising means defining a concave channel-like outwardly extending curved flange on the periphery of one of said articles, means defining a second concave channel-like outwardly extending curved flange on the periphery of the other of said articles, means defining a first seaming strip secured to the first article which conforms to an inner surface of said first article and to the contour of said first flange, means defining a second seaming strip secured to the second article which conforms to an inner surface of the second article and to the contour of said second flange, one of said seaming strips having an additional concave channel-like curved portion which overlaps the other seaming strip and defines a cavity between the two seaming strips, and a rubber-like resilient gasket disposed in said cavity and which cooperates with said strips to form a leak-proof seal.

6. An improved means for sealing the peripheries of two articles in a leak-proof relationship comprising means defining a concave channel-like outwardly extending curved flange on the periphery of one of said articles, means defining a second concave channel-like outwardly extending curved flange on the periphery of the other of said articles, means defining a first seaming strip secured to the first article which conforms to an inner surface of said first article and to the contour of said first flange, means defining a second seaming strip secured to the second article which conforms to an inner surface on the second article and to the contour of said second flange, said last mentioned contour being symmetrical to said first mentioned contour, a rubber-like resilient gasket interposed between said seaming strips, one of said strips being wider than the other and having an additional concave channel-like curved portion which overlaps the other seaming strip so as to encompass said gasket to define a leak-proof seal.

7. In an article of manufacture comprising two half sections which when placed in complementary relationship define an external wing tank of the jettisonable type, the improvement in the means for sealing said sections together in leak-proof relationship comprising means defining an outwardly extending concave channel-like curved flange on the periphery of one of said half sections, means defining a second outwardly extending concave channel-like curved flange on the periphery of the other of said articles, means defining a first seaming strip secured to the first half section which conforms to the inner surface of said first half section and to the contour of said first flange, means defining a second seaming strip secured to the second half section which conforms to the inner surface of said half section and to the contour of said second flange, one of said seaming strips being wider than the other and extending beyond the flanges and having an additional concave channel-like curved portion which overlaps the other seaming strip and defines a cavity between the two seaming strips, and a rubber-like resilient gasket disposed in said cavity and which cooperates with said strips to define a leak-proof seal.

8. In an article of manufacture comprising two half sections which when placed in complementary relationship defining an external wing tank of the jettisonable type, the improvement in the means of sealing said sections together in leak-proof relationship comprising means defining an outwardly extending concave channel-like flange on the periphery of one of said half sections, means defining a second outwardly extending concave channel-like curved flange on the periphery of the other of said half sections, means defining a first seaming strip secured to the first half section which conforms to the inner surface of said first half section and to the contour of said first flange, means defining a second seaming strip secured to the second half section which conforms to the inner surface of the second half section and to the contour of said second flange, said last mentioned contour being symmetrical to said first mentioned contour, a rubber-like resilient gasket disposed between said seaming strips, one of said seaming strips being wider than the other and extending beyond the flanges and having an additional curved portion which overlaps the other seaming strip so as to encompass said gasket to define a leak-proof seal.

9. In an external jettisonable wing tank or napalm bomb comprising two sections each defining respectively a first and second half section of the wing tank of streamline contour and adapted to be positioned in complementary relationship with one another, means for internally reinforcing said streamlined tank including means defining baffle plates and reinforcing ribs, means allowing admission and withdrawal of fuel from said wing tank, means for sealing said sections in complementary leak-proof relationship, and means cooperating with said reinforcing means for attaching said tank to a wing including: means defining a saddle substantially conforming to the inner surface of one of said half sections and attached to said inner surface and having longitudinal and transverse indentations, and coupling means associated with said transverse indentations.

10. In an external jettisonable wing tank or napalm bomb comprising two sections each defining respectively a first and second half section of the wing tank of streamline contour and adapted to be positioned in complementary relationship with one another, means for internally reinforcing said streamlined tank including means defining baffle plates and reinforcing ribs, means allowing admission and withdrawal of fuel from said wing tank, means for sealing said sections in complementary leak-proof relationship, and means cooperating with said reinforcing means for attaching said tank to a wing including: means defining a saddle substantially conforming to the inner surface of one of said half sections and attached to said inner surface and having longitudinal and transverse indentations, and coupling means associated with said transverse indentations and including plate means straddling the space defined by said transverse indentations, threaded bolt receiving means affixed to said indentations, hook means, and bolts inserted in apertures provided in the hook means, half section and plate means.

11. In an external jettisonable wing tank or napalm bomb comprising two sections each defining respectively a first and second half section of the wing tank of streamline contour and adapted to be positioned in complementary relationship with one another, means for internally reinforcing said streamlined tank including means defining baffle plates and reinforcing ribs, means cooperating with said reinforcing means for attaching said tank to an aircraft wing, means for sealing said sections in complementary leak-proof relationship, and means allowing admission and withdrawal of fuel from said tank including: an air supply inlet having a tubular insert, means defining an air gap between one end of the tube and an inner surface of one of said half sections and a fuel supply outlet having a tubular insert and screen means connected at one end to one of said half sections and at the other end to the first mentioned half section.

References Cited in the file of this patent

UNITED STATES PATENTS

| | | |
|---|---|---|
| 223,949 | Preater | Jan. 27, 1880 |
| 502,846 | Caird | Aug. 8, 1893 |
| 901,534 | Hamlin | Oct. 20, 1908 |
| 1,043,412 | Faunce | Nov. 5, 1912 |
| 1,522,630 | Ireland | Jan. 13, 1925 |
| 1,647,056 | Sebell | Oct. 25, 1927 |
| 1,754,051 | Rosenberg | Apr. 8, 1930 |
| 1,811,659 | Andrake | June 23, 1931 |
| 1,926,107 | Morehead | Sept. 12, 1933 |
| 2,037,923 | Punte | Apr. 21, 1936 |
| 2,063,557 | Punte | Dec. 8, 1936 |
| 2,086,134 | Ludwick | July 6, 1937 |
| 2,140,672 | Gray et al. | Dec. 20, 1938 |
| 2,263,815 | Northup et al. | Nov. 25, 1941 |
| 2,355,084 | Kurrle | Aug. 8, 1944 |
| 2,381,402 | Weber et al. | Aug. 7, 1945 |
| 2,402,253 | MacLeod | June 18, 1946 |
| 2,417,342 | Bach | Mar. 11, 1947 |
| 2,472,317 | Sorenson | June 7, 1949 |
| 2,566,777 | Schmidt | Sept. 4, 1951 |
| 2,591,913 | Bowers et al. | Apr. 8, 1952 |
| 2,596,139 | Fletcher | May 13, 1952 |
| 2,665,862 | Grill | Jan. 12, 1954 |

FOREIGN PATENTS

| | | |
|---|---|---|
| 13,048 | Great Britain | of 1885 |